United States Patent
Malnati et al.

(10) Patent No.: US 9,667,573 B2
(45) Date of Patent: May 30, 2017

(54) IDENTIFICATION OF AUTOMATION CANDIDATES USING AUTOMATION DEGREE OF IMPLEMENTATION METRICS

(71) Applicants: James R Malnati, Stillwater, MN (US); John Troini, Gilroy, CA (US); Robert Jamieson, Kuala Lumpur (MY)

(72) Inventors: James R Malnati, Stillwater, MN (US); John Troini, Gilroy, CA (US); Robert Jamieson, Kuala Lumpur (MY)

(73) Assignee: Unisys Corporation, Blue Bell, PA (US)

( * ) Notice: Subject to any disclaimer, the term of this patent is extended or adjusted under 35 U.S.C. 154(b) by 169 days.

(21) Appl. No.: 14/697,738

(22) Filed: Apr. 28, 2015

(65) Prior Publication Data

US 2016/0323207 A1    Nov. 3, 2016

(51) Int. Cl.
    *G06F 15/173*    (2006.01)
    *H04L 12/58*    (2006.01)
    *H04L 12/24*    (2006.01)

(52) U.S. Cl.
    CPC .............. *H04L 51/02* (2013.01); *H04L 41/06* (2013.01); *H04L 41/0627* (2013.01); *H04L 41/0681* (2013.01); *H04L 41/0876* (2013.01); *H04L 41/0886* (2013.01); *H04L 41/16* (2013.01); *H04L 51/14* (2013.01)

(58) Field of Classification Search
    CPC .............. H04L 12/2814; H04L 12/2823; H04L 41/06–41/0695; H04L 51/02; G06N 5/00; G06N 5/02–5/025; G05B 13/00; G05B 13/0265–13/0295
    See application file for complete search history.

(56) References Cited

U.S. PATENT DOCUMENTS

| | | | | |
|---|---|---|---|---|
| 6,353,902 B1* | 3/2002 | Kulatunge | ............... | H04L 41/06 714/47.3 |
| 6,601,048 B1* | 7/2003 | Gavan | ..................... | H04J 3/175 379/111 |
| 7,092,940 B1* | 8/2006 | Ethen | ...................... | G06F 9/546 |
| 7,921,174 B1* | 4/2011 | Denise | ................. | G06Q 10/107 709/206 |
| 8,489,522 B1* | 7/2013 | Hirsch | ................. | G06N 99/005 706/12 |
| 8,578,439 B1* | 11/2013 | Mathias | ............. | H04N 5/44582 725/141 |
| 8,786,425 B1* | 7/2014 | Hutz | ..................... | H04M 11/04 340/506 |
| 8,823,536 B2* | 9/2014 | Avner | ................. | G06F 11/0748 340/679 |
| 8,832,654 B2* | 9/2014 | Malnati | ............... | H04L 41/0681 717/101 |

(Continued)

*Primary Examiner* — Brendan Higa
(74) *Attorney, Agent, or Firm* — Robert P. Marley; Richard J. Gregson

(57) ABSTRACT

Non-automated read-and-reply console messages may be automated. These messages may be classified into impact groups in which the messages may be removed from the database or sent to an automation analyzer for analysis. As more messages become automated, a debugging mode may be enabled to allow an operator to respond to a message with a proposed action. If the proposed action is aligned with an action predetermined in response to the automation analysis, the operator may be allowed to respond to future actions.

15 Claims, 9 Drawing Sheets

(56) References Cited

U.S. PATENT DOCUMENTS

| | | | | |
|---|---|---|---|---|
| 9,104,537 | B1* | 8/2015 | Penilla | G06F 17/00 |
| 2006/0149819 | A1* | 7/2006 | Auhagen | G06Q 10/107 |
| | | | | 709/206 |
| 2007/0124263 | A1* | 5/2007 | Katariya | G06F 17/30663 |
| | | | | 706/14 |
| 2008/0282235 | A1* | 11/2008 | Jadhav | G06F 11/3676 |
| | | | | 717/131 |
| 2010/0272349 | A1* | 10/2010 | Connell | G06K 9/00664 |
| | | | | 382/159 |
| 2011/0307904 | A1* | 12/2011 | Malnati | G06F 9/541 |
| | | | | 719/313 |
| 2013/0159202 | A1* | 6/2013 | Darden, II | G06Q 10/06 |
| | | | | 705/306 |
| 2013/0174171 | A1* | 7/2013 | Doster | G06F 9/4881 |
| | | | | 718/102 |
| 2014/0095063 | A1* | 4/2014 | Saraswat | G06Q 30/0224 |
| | | | | 701/410 |
| 2015/0215329 | A1* | 7/2015 | Singla | H04L 63/1416 |
| | | | | 726/23 |
| 2015/0281155 | A1* | 10/2015 | Cue | H04L 51/12 |
| | | | | 715/752 |
| 2015/0339373 | A1* | 11/2015 | Carlson | G06F 17/30601 |
| | | | | 707/737 |
| 2016/0112240 | A1* | 4/2016 | Sundaresan | H04L 67/306 |
| | | | | 726/1 |
| 2016/0179866 | A1* | 6/2016 | Chen | G06F 17/30722 |
| | | | | 707/700 |

* cited by examiner

IDENTIFICATION OF AUTOMATION CANDIDATES USING AUTOMATION DEGREE OF IMPLEMENTATION METRICS

FIELD OF THE DISCLOSURE

The instant disclosure relates to system management. More specifically, this disclosure relates to analyzing the automation degree of implementation of messages in a computing system.

BACKGROUND

For information technology (IT) business enterprises to run smoothly in a constantly-evolving technological landscape, operational systems require extreme levels of precision and attention from operators and users of the system. Computer operators of these systems are responsible for performing functions that are essential to the continuation of the information flow between several systems, such as inventory control systems and accounting systems. One of these functions may be answering a read-and-reply console message. These operators must act quickly to avoid any malfunctions that can occur in the system. Operators who are rushed to act accordingly may incorrectly respond to a message, and this error can have catastrophic consequences to the system.

Read-and-reply console messages are transmitted daily to system operators by batch jobs. Typically, read-and-reply console messages must be answered by an operator. If the operator is not available to answer a message or is uncertain as to how to proceed with answering the message, the operation of the system may be delayed. Any delays in the flow of the system may result not only in a loss of production but also a breakdown of critical components. Furthermore, in environments where there are several operators that interface with the system, each operator response may differ from each other. This lack of uniformity of operator responses can confuse the system especially if the system performs a set of functions in response to the operator's answer to the message.

SUMMARY

An automated system described below may be implemented that allows non-automated read-and-reply console messages to be automated. The automated system may be triggered when a message system receives a collection of read-and-reply console messages that require an action by an operator. The messages are vetted and grouped into different impact groups based on whether the messages are critical and already automated. Degree of implementation statistics are acquired from the received messages. When a significant number of duplicated messages are received, the message system may invoke an automation analyzer by transmitting the duplicated messages to the analyzer. The automation analyzer may examine statistics related to the messages by utilizing any desired statistical method or algorithm to determine whether the duplicated message is a candidate for automation. Automation of a message may include taking an automatic action, by the message system, on the message based on one or more predetermined actions prescribed by the computing system or any components associated with the computing system, such as the automation analyzer. Once a non-automated message is automated, the action required by the operator may be removed. Removal of the operator in the flow of the system may increase the speed at which read-and-reply console messages are answered.

In addition, a method may be implemented that allows an operator to compare a proposed action taken for an automated message to an action that exists in a database of automated messages and corresponding actions. The method may be triggered by enabling a debugging mode on the message system that allows operators to submit proposed actions without those actions being implemented into the computing system. A read-and-reply console message system may receive a collection of messages that require an action by an operator. When the operator takes a proposed action on a message, the proposed action is logged, and the message system searches a database of automated messages and actions for a predetermined action taken on the message. Verification of the proposed action may allow an operator to be trained on appropriate actions that should be taken on read-and-reply console messages based on what is recorded in the database without affecting the computing system. Additionally, if a proposed action presents a better alternative to a predetermined action taken on a message, an automation analyzer may be invoked to examine the message and determine if actions on a particular message should be modified.

According to one embodiment, a method may include receiving one or more non-automated messages from a host system; logging one or more proposed actions taken by an operator on the one or more non-automated messages; searching a database for one or more predetermined actions taken automatically by a computing system on the one or more non-automated messages; and comparing the one or more proposed actions to the one or more predetermined actions taken automatically. In response to a difference between the one or more proposed actions and the one or more predetermined actions, the method may further include transmitting the difference to an automation analyzer, wherein the automation analyzer is configured to disable one or more future actions taken by the operator on one or more future non-automated messages.

According to another embodiment, a method may include receiving a plurality of messages from a host system; storing the plurality of messages into a database; classifying each message in the plurality of messages into one or more impact groups, where at least one of the one or more impact groups includes critical non-automated messages; determining that a portion of the messages in the plurality of messages classified in the impact group of critical non-automated messages are duplicated; and transmitting the duplicated messages to an automation analyzer, wherein the automation analyzer is configured to analyze a potential of automating the duplicated messages.

According to a further embodiment, a method may include receiving a plurality of messages relating to events occurring on a host system; determining, for each message of the plurality of messages, whether each message evokes an automated response; determining, for the messages determined to not evoke an automated response, duplication within the non-automated messages; and transmitting the duplicated messages to an automation analyzer, wherein the automation analyzer is configured to analyze a potential of automating the duplicated messages.

According to an additional embodiment, an apparatus may include a processor and a memory coupled to the processor. The processor may be configured to perform the steps of receiving one or more non-automated messages from a host system; logging one or more proposed actions taken by an operator on the one or more non-automated messages; searching a database for one or more predetermined actions taken automatically by a computing system on the one or more non-automated messages; and comparing the one or more proposed actions to the one or more predetermined actions taken automatically. In response to a difference between the one or more proposed actions and the one or more predetermined actions, the processor may be further configured to perform the steps of transmitting the difference to an automation analyzer, wherein the automation analyzer is configured to disable one or more future actions taken by the operator on one or more future non-automated messages.

According to yet another embodiment, an apparatus may include a processor and a memory coupled to the processor. The processor may be configured to perform the steps of receiving a plurality of messages from a host system; storing the plurality of messages into a database; classifying each message in the plurality of messages into one or more impact groups, where at least one of the one or more impact groups includes critical non-automated messages; determining that a portion of the messages in the plurality of messages classified in the impact group of critical non-automated messages are duplicated; and transmitting the duplicated messages to an automation analyzer, wherein the automation analyzer is configured to analyze a potential of automating the duplicated messages.

According to a further embodiment, an apparatus may include a processor and a memory coupled to the processor. The processor may be configured to perform the steps of receiving a plurality of messages relating to events occurring on a host system; determining, for each message of the plurality of messages, whether each message evokes an automated response; determining, for the messages determined to not evoke an automated response, duplication within the non-automated messages; and transmitting the duplicated messages to an automation analyzer, wherein the automation analyzer is configured to analyze a potential of automating the duplicated messages.

According to yet another embodiment, a computer program product may include a non-transitory computer readable medium containing instructions which, when executed by a processor of a computing system, cause the processor to receive one or more non-automated messages from a host system; log one or more proposed actions taken by an operator on the one or more non-automated messages; search a database for one or more predetermined actions taken automatically by a computing system on the one or more non-automated messages; and compare the one or more proposed actions to the one or more predetermined actions taken automatically. In response to a difference between the one or more proposed actions and the one or more predetermined actions, the non-transitory computer readable medium of the computer program product may further include instructions which, when executed by the processor of the computing system, cause the processor to transmit the difference to an automation analyzer, wherein the automation analyzer is configured to disable one or more future actions taken by the operator on one or more future non-automated messages.

According to a further embodiment, a computer program product may include a non-transitory computer readable medium containing instructions which, when executed by a processor of a computing system, cause the processor to receive a plurality of messages from a host system; store the plurality of messages into a database; classify each message in the plurality of messages into one or more impact groups, where at least one of the one or more impact groups includes critical non-automated messages; determine that a portion of the messages in the plurality of messages classified in the impact group of critical non-automated messages are duplicated; and transmit the duplicated messages to an automation analyzer, wherein the automation analyzer is configured to analyze a potential of automating the duplicated messages.

According to an additional embodiment, a computer program product may include a non-transitory computer readable medium containing instructions which, when executed by a processor of a computing system, cause the processor to receive a plurality of messages relating to events occurring on a host system; determine, for each message of the plurality of messages, whether each message evokes an automated response; determine, for the messages determined to not evoke an automated response, duplication within the non-automated messages; and transmit the duplicated messages to an automation analyzer, wherein the automation analyzer is configured to analyze a potential of automating the duplicated messages.

According to one embodiment, a method for identifying automation candidates using automation degree of implementation metrics may include receiving, by a message system, a plurality of messages relating to events occurring on a host system. The method may also include determining, by the message system for each message of the plurality of messages, whether each message evokes an automated response. The method may further include determining, by the message system for the messages determined to not evoke an automated response, duplication within the non-automated messages. The method may also include transmitting, by the message system, the duplicated messages to an automation analyzer, wherein the automation analyzer is configured to analyze a potential of automating the duplicated messages.

According to another embodiment, an apparatus may include a processor and a memory coupled to the processor. The processor may be configured to perform the step of receiving a plurality of messages relating to events occurring on a host system. The processor may also be configured to perform the step of determining, for each message of the plurality of messages, whether each message evokes an automated response. The processor may be further configured to perform the step of determining, for the messages determined to not evoke an automated response, duplication within the non-automated messages. The processor may also be configured to perform the step of transmitting the duplicated messages to an automation analyzer, wherein the automation analyzer is configured to analyze a potential of automating the duplicated messages.

According to yet another embodiment, a computer program product may include a non-transitory computer readable medium. The medium may include instructions which, when executed by a processor of a computing system, cause the processor to receive a plurality of messages relating to events occurring on a host system. The medium may also include instructions which, when executed by the processor of the computing system, cause the processor to determine, for each message of the plurality of messages, whether each message evokes an automated response. The medium may further include instructions which, when executed by the processor of the computing system, cause the processor to determine, for the messages determined to not evoke an automated response, duplication within the non-automated messages. The medium may also include instructions which, when executed by the processor of the computing system, cause the processor to transmit the duplicated messages to an automation analyzer, wherein the automation analyzer is configured to analyze a potential of automating the duplicated messages.

According to one embodiment, a method for identifying progress towards complete message system integration using automation degree of implementation metrics may include receiving, by a message system, a plurality of messages relating to events occurring on a host system. The method may also include classifying, by the message system, each of the plurality of messages into one of three message groups comprising a critical automated messages group, a critical non-automated messages group, and a non-critical messages group. The method may further include determining, by the message system, progress towards complete message system automation by analyzing one or more of the three message groups.

According to another embodiment, an apparatus may include a processor and a memory coupled to the processor. The processor may be configured to perform the step of receiving a plurality of messages relating to events occurring on a host system. The processor may also be configured to perform the step of classifying each of the plurality of messages into one of three message groups comprising a critical automated messages group, a critical non-automated messages group, and a non-critical messages group. The processor may be further configured to perform the step of determining progress towards complete message system automation by analyzing one or more of the three message groups.

According to yet another embodiment, a computer program product may include a non-transitory computer readable medium. The medium may include instructions which, when executed by a processor of a computing system, cause the processor to receive a plurality of messages relating to events occurring on a host system. The medium may also include instructions which, when executed by a processor of a computing system, cause the processor to classify each of the plurality of messages into one of three message groups comprising a critical automated messages group, a critical non-automated messages group, and a non-critical messages group. The medium may further include instructions which, when executed by a processor of a computing system, cause the processor to determine progress towards complete message system automation by analyzing one or more of the three message groups.

According to one embodiment, a method for implementing debug and verify execution modes in computing systems calculating automation degree of implementation metrics may include selecting, by the message system, a first message execution mode for messages received by the message system, wherein the first message execution mode is selected from a group consisting of a first message execution mode and a second message execution mode. The method may also include receiving, by a message system, a first plurality of messages relating to events occurring on a host system. The method may further include processing, by the message system, the first plurality of messages in accordance with the selected first message execution mode, wherein processing in accordance with the first message execution mode comprises executing actions invoked by execution of a first portion of the first plurality of messages and logging, but not executing, actions invoked by execution of a second portion of the first plurality of messages.

According to another embodiment, an apparatus may include a processor and a memory coupled to the processor. The processor may be configured to perform the step of selecting a first message execution mode for messages received by the message system, wherein the first message execution mode is selected from a group consisting of a first message execution mode and a second message execution mode. The processor may also be configured to perform the step of receiving a first plurality of messages relating to events occurring on a host system. The processor may be further configured to perform the step of processing the first plurality of messages in accordance with the selected first message execution mode, wherein processing in accordance with the first message execution mode comprises executing actions invoked by execution of a first portion of the first plurality of messages and logging, but not executing, actions invoked by execution of a second portion of the first plurality of messages.

According to yet another embodiment, a computer program product may include a non-transitory computer readable medium. The medium may include instructions which, when executed by a processor of a computing system, cause the processor to select a first message execution mode for messages received by the message system, wherein the first message execution mode is selected from a group consisting of a first message execution mode and a second message execution mode. The medium may also include instructions which, when executed by a processor of a computing system, cause the processor to receive a first plurality of messages relating to events occurring on a host system. The medium may further include instructions which, when executed by a processor of a computing system, cause the processor to process the first plurality of messages in accordance with the selected first message execution mode, wherein processing in accordance with the first message execution mode comprises executing actions invoked by execution of a first portion of the first plurality of messages and logging, but not executing, actions invoked by execution of a second portion of the first plurality of messages.

The foregoing has outlined rather broadly the features and technical advantages of the present invention in order that the detailed description of the invention that follows may be better understood. It is first noted here that the terms "transaction" and "action" may be synonymous throughout this disclosure. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a limitation of the present invention.

DETAILED DESCRIPTION

Figure 1:
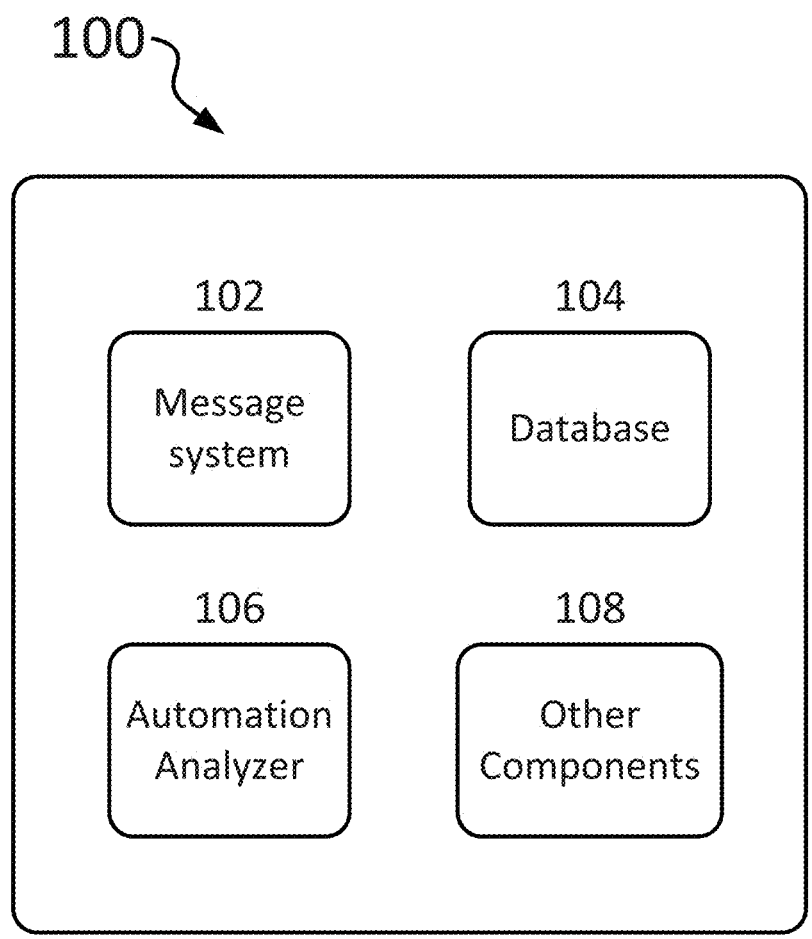
FIG. 1 is an illustration of a computing system detailing how a non-automated message may be analyzed to determine if the message is a candidate for automation according to one embodiment.

FIG. 1 is an illustration of a computing system detailing how a non-automated message may be analyzed to determine if the message is a candidate for automation according to one embodiment. The computing environment 100 may contain a message system 102, a database 104, an automation analyzer 106, and other components 108 as needed or desired to the computing system 100. Each of the components 102, 104, 106, and 108 of computing environment 100, including computing system 100, may contain one or more central processing units, processors, additional databases, user interfaces, random access memory (RAM), a read only memory (ROM), one or more system buses, a keyboard, a pointing device, a touch screen, an input/output (I/O) adapter, a communications adapter, a user interface adapter, a display adapter, and other computing components. The message system 102 may be configured to control and manage read-and-reply console messages and actions received by a host system. A read-and-reply console message may contain critical information that requires a response from an operator to allow the batch job to proceed with execution of further calculations. For the purposes of this document, the term "read-and-reply console message" may be denoted as "message."

The message system 102 may be configured to receive messages relating to events occurring on a host system and a list of actions associated with the messages. The message system 102 may be co-located with the host system generating the messages on a single computer system or the message system 102 may be located on a separate computer system. The messages may be stored on a database 104 that is controlled by a processing unit of the message system 102 or by a processing unit contained in the computing system 100. The messages may be analyzed by the message system 102 based on data within the messages. In one embodiment, the messages stored on the database 104 may be classified into impact groups. The impact groups may include a group of critical, automated messages, a group of critical non-automated messages, and a group of non-critical messages. Information associated with the messages in the critical non-automated message impact group may be reviewed to determine if a particular message is suitable to be automated. Deciding whether to automate a message may be dependent on statistical information associated with the message, such as the number of messages that are duplicates, the nature or type of message being received at the message system 102, and other factors. If the message is suitable for automation, the message system may be configured to transmit the message to the automation analyzer for analysis.

In some embodiments, the critical non-automated messages may be logged. According to another embodiment, the number of times each of the critical non-automated messages is received may also be logged. In addition, in some embodiments, one or more of the critical non-automated messages may be classified as candidates for automation, wherein classifying a message as a candidate for automation identifies the message as a message capable of improving an automation degree of implementation metric if automated.

The database 104 may be configured to receive messages transmitted to the message system 102. The messages on the database 104 may be classified into impact groups. In one embodiment, these messages may remain on the database 104 sorted by its respective impact group. In another embodiment, additional databases may exist on the database 104. Each additional database may contain the messages belonging to an impact group. In addition, database 104 or additional databases contained within database 104 may include actions that correspond to the messages that have been previously addressed or predetermined by the computing system 100. It should be appreciated by those skilled in the art that other embodiments and methods of storing messages and actions may be utilized.

The automation analyzer 106 may be configured to receive messages, information related to the received messages, and actions taken on the received messages from a message system 102. The messages may include duplicated messages or any messages which have been predetermined to be received by the automation analyzer 106. The automation analyzer 106 may be configured to analyze the received messages, information related to the received messages, and actions taken on the received messages using a myriad of algorithms and statistical methods. Some of these may include Correlation Analysis, Monte-Carlo simulation, Factor Analysis, Mean Square Weighted Deviation (MSWD), Regression Analysis, Time Series Analysis, and the like. The automation analyzer 106 may be configured to automate non-automated messages that qualify for automation. For example, if a duplicate message has been submitted to the message system 102 several times within a day, it may signify that the message is a common message that is submitted frequently by an operator. Automation, in this case, may allow a uniform action for the message to be implemented in place of an operator's action. In addition, the operator may test his action against a predetermined action to determine a degree of alignment of the operator's actions versus the predetermined actions. Based on an operator's degree of alignment, the automation analyzer 106 may enable or disable an operator from taking future actions on future non-automated messages. The automation analyzer 106 may automate all or some of the computing system 100 and message system 102 based on any information, including statistical information, obtained related to a received message.

Figure 2:
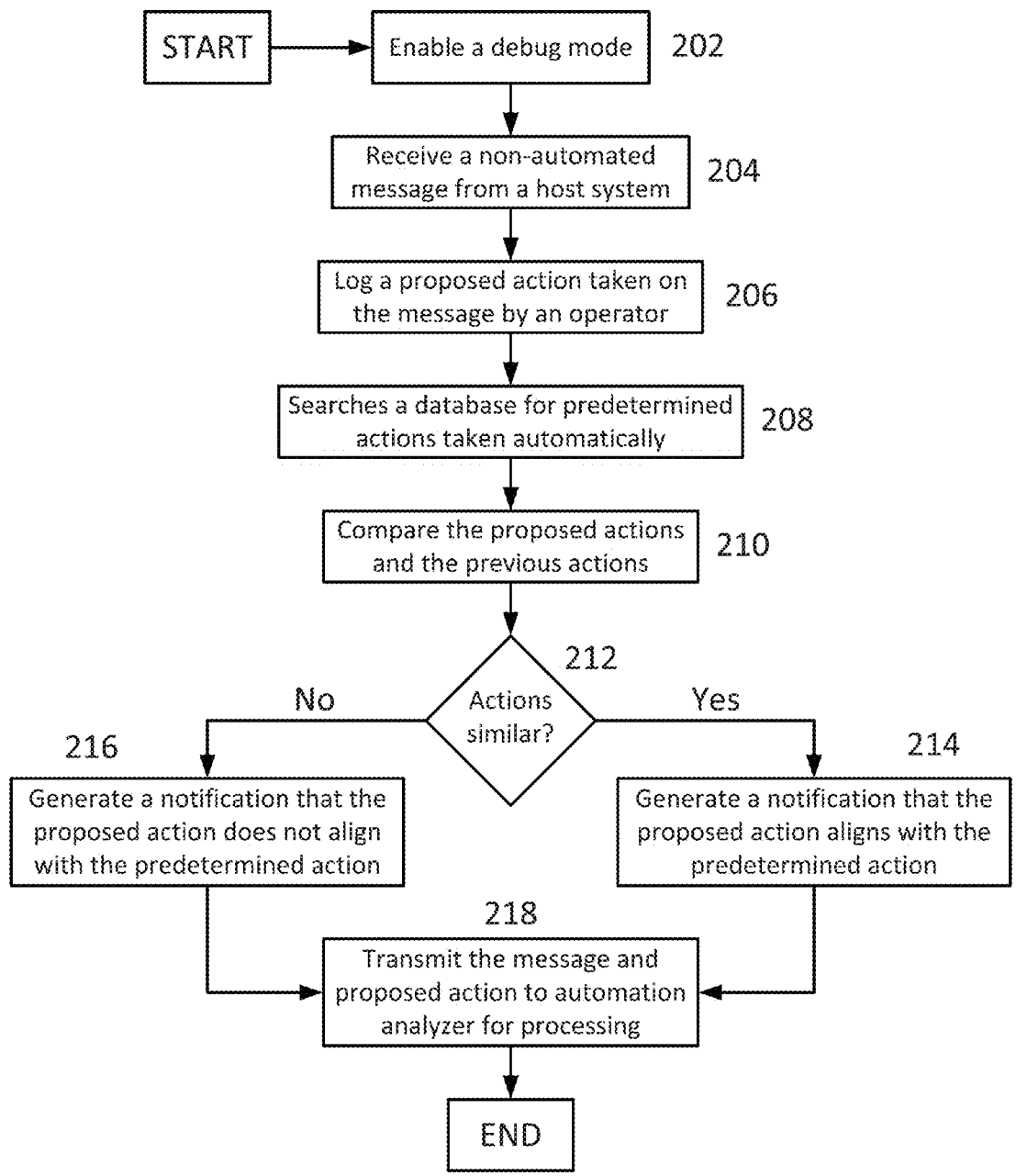
FIG. 2 is a flowchart illustrating a method of determining whether a proposed action taken on a message is similar to a predetermined action that exists in the computing system according to one embodiment.

FIG. 2 is a flowchart illustrating a method of determining whether a proposed action taken on a message is similar to a predetermined action that exists in the computing system according to one embodiment. The method begins at step 202 where the message system 102 may be configured to enable a debugging mode. The debugging mode may allow actions taken by an operator to be logged but not enforced by the message system 102. If the debugging mode is already enabled, step 202 may be bypassed. In an alternate embodiment, a debugging mode may be absent from the computing system 100, and the operator may perform an action on the message without enforcing the action. In this case, the action may initially be logged. This may allow time for the operator to examine the appropriate action to take on the message before enforcing the action.

At step 204, the message system 102 may receive one or more non-automated messages from a host system. In the debugging mode, an operator may take one or more proposed actions on the messages that are not enforced. After the proposed actions are taken by the operator, the message system 102 may log the proposed actions of the non-automated messages at step 206. Logging a proposed action may include saving the proposed action in a database 104 or recording statistical information related to the message and action. At step 208, the message system 102 may be configured to search the database 104 for predetermined actions that are or have been previously taken on the non-automated messages automatically. The predetermined actions may be searched and sorted based on searching criteria, such as the date that the action was taken, the content of the message, and the like. If the process of answering messages experiences a daily change, some predetermined actions of messages may be searched based on a desired time period.

At step 210, the proposed actions and the predetermined actions may be compared by the message system 102 to determine if the proposed actions taken by the operator and the predetermined actions searched by the message system 102 are similar. If it is determined that the proposed actions are similar to the predetermined actions—a "Yes" response from the decision diamond at step 212, the message system 102 may be configured to generate a notification that any or all of the proposed actions align with the predetermined actions at step 214. Conversely, if the proposed actions are not similar to the predetermined actions—a "No" response from the decision diamond at step 212, the message system 102 may be configured to generate a notification that any or all of the proposed actions do not align with the predetermined actions at step 216. After the notification is generated at steps 214 and 216, the message system 102 may be configured to transmit the messages, information related to the messages, and the proposed actions to the automation analyzer 106 at step 218. The automation analyzer 106 may be configured to allow an operator to take future actions on future non-automated messages based on a percentage of similarity of proposed and predetermined actions reaching a threshold level of percentage. On the other hand, the automation analyzer 106 may be configured to disallow an operator to take future actions on future non-automated based on a percentage of similarity of proposed and predetermined actions not reaching a threshold level of percentage. Alternatively, the message system 102 may allow or disallow an operator to take future actions on future non-automated messages. After step 218, the method terminates.

Figure 3:
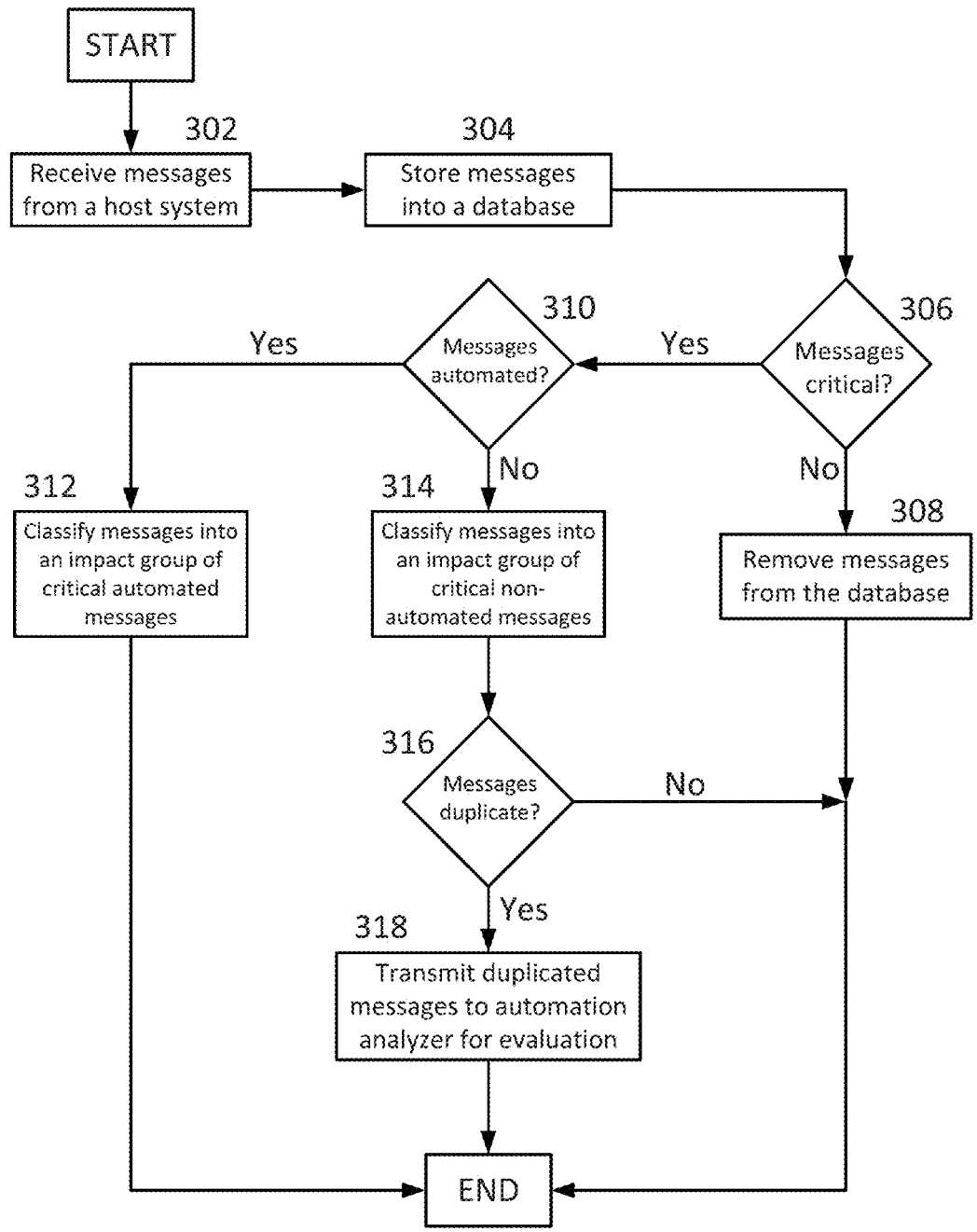
FIG. 3 is a flowchart illustrating a method of determining whether a non-automated messages should be automated according to one embodiment.

FIG. 3 is a flowchart illustrating a method of determining whether a non-automated messages should be automated according to one embodiment. The method begins at step 302 where the message system 102 may be configured to receive one or more messages from a host system. These messages may convey commands or instructions for an operator to perform. At step 304, the messages may be stored on a database 104. After the messages are stored, a determination is made at the database 104 in step 306 as to whether the messages are critical. This determination may be performed by a processing unit of the database 104 or a processing unit of the message system 102. If the messages are not critical—a "No" response of the decision diamond at step 306, the message system 102 may be configured to remove the messages from the database 104 at step 308. Non-critical messages may include messages that are obsolete and messages deemed to be non-critical by the message system 102 or by any of the components of computing system 100. After the messages are removed from the database 104, the method terminates.

If the messages are determined to be critical—a "Yes" response of the decision diamond at step 306, an additional determination is made as to whether the messages are already automated at step 310. At any time before or during step 310, the message system 102 may be configured to vet all of the messages remaining in the database 104. If there are any messages in the database 104 that are automated—a "Yes" response of the decision diamond at step 310, the message system 102 may be configured to classify the messages into an impact group of critical automated messages at step 312. Messages in this impact group may remain in the database 104 and may be used to search a predetermined action for comparison to a proposed action. After step 312, the method terminates.

If there are any messages in the database 104 that are not automated—a "No" response of the decision diamond at step 310, the message system 102 may be configured to classify the messages into an impact group of critical non-automated messages at step 314. These messages may be candidates for automation. At step 316, a determination is made as to whether any of the messages in the critical non-automated impact group are duplicates. If the messages in this impact group are duplicates—a "Yes" response of the decision diamond at step 316, the message system 102 may be configured to transmit the duplicated messages to the automation analyzer 106 for evaluation at step 318. The message system 102 may be configured to count the number of duplicate messages that are received per day. The automation analyzer 106 may be configured to analyze the received messages, information related to the received messages, and actions taken on the received messages using a myriad of algorithms and statistical methods. Some of these may include Correlation Analysis, Monte-Carlo simulation, Factor Analysis, Mean Square Weighted Deviation (MSWD), Regression Analysis, Time Series Analysis, and the like. The automation analyzer 106 may be configured to automate to critical non-automated messages based on the results of the applied algorithms and statistical methods. After step 318, the method terminates. If the messages in the impact group of critical non-automated messages are not duplicates—a "No" response of the decision diamond at step 316, the method terminates. It is worth noting that the non-automated messages in the critical non-automated message impact group may be automated for any reason set forth based on analysis at the automation analyzer 106. The message system 102 may also generate categorization rules for any non-automated or duplicate message in response to the automation analyzer 106 analyzing a potential of automating the duplicated messages. For example, in one embodiment, the message system 102 may generate categorization rules based on the results of analysis performed by the automation analyzer 106. The message system 102 may subsequently use the categorization rules to identify and categorize messages into one of the message groups that include a critical automated messages group, a critical non-automated messages group, and a non-critical messages group.

In some embodiments, messages may be contained within a variable group member name. Variable group member names may be utilized to identify messages and associated actions. For example, the variable group member name "OFF" may refer to any messages that instruct the operator to disable the system. Any variation of the message that instructs the operator to disable the system may be assigned the variable group member name "OFF." In other embodiments, the variable group member names may contain the entire message, such as "TURN THE SYSTEM OFF." The variable group member name may include a maximum of 128 characters including spaces. This represents a simple way to gather statistics about the messages and further targeted information to assist in the determination step of automation.

Figure 4:
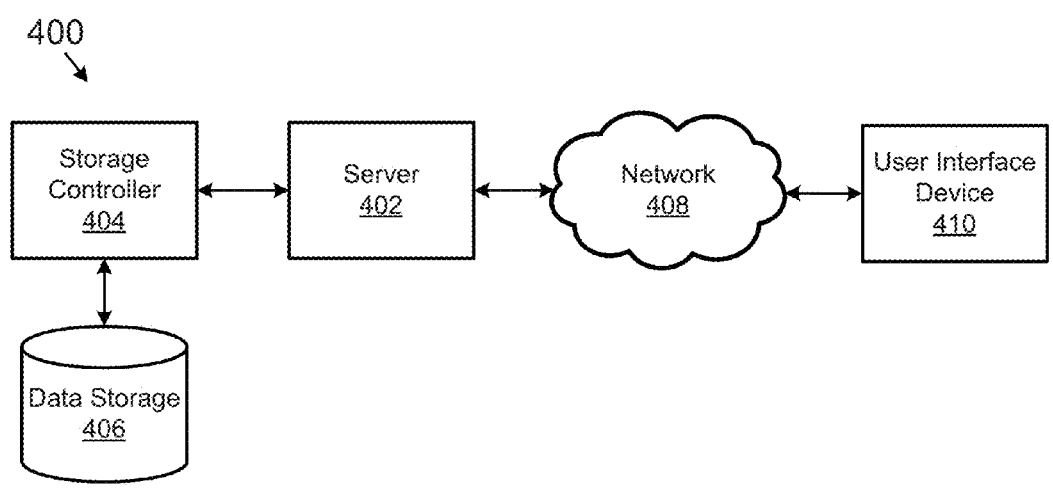
FIG. 4 illustrates one embodiment of a system for transferring information, including a system for automating non-automated messages according to one embodiment.

FIG. 4 illustrates one embodiment of a system for transferring information, including a system for automating non-automated messages according to one embodiment. The system 400 may include a server 402, a data storage device 406, a network 408, and a user interface device 410. In a further embodiment, the system 400 may include a storage controller 404, or storage server configured to manage data communications between the data storage device 406 and the server 402 or other components in communication with the network 408. In an alternative embodiment, the storage controller 404 may be coupled to the network 408. The system 400 may support code analysis by hosting the message system 102 of FIG. 1 on the computing system 100.

In one embodiment, the user interface device 410 is referred to broadly and is intended to encompass a suitable processor-based device such as a desktop computer, a laptop computer, a personal digital assistant (PDA) or tablet computer, a smartphone, or other mobile communication device having access to the network 408. In a further embodiment, the user interface device 410 may access the Internet or other wide area or local area network to access a web application or web service hosted by the server 402 and may provide a user interface for communicating with the message system 102, the database 104, the automation analyzer 106, and/or any of the other components 108 that may be controlled by separate processing units of FIG. 1.

The network 408 may facilitate communications of data between the server 402 and the user interface device 410. The network 408 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 5:
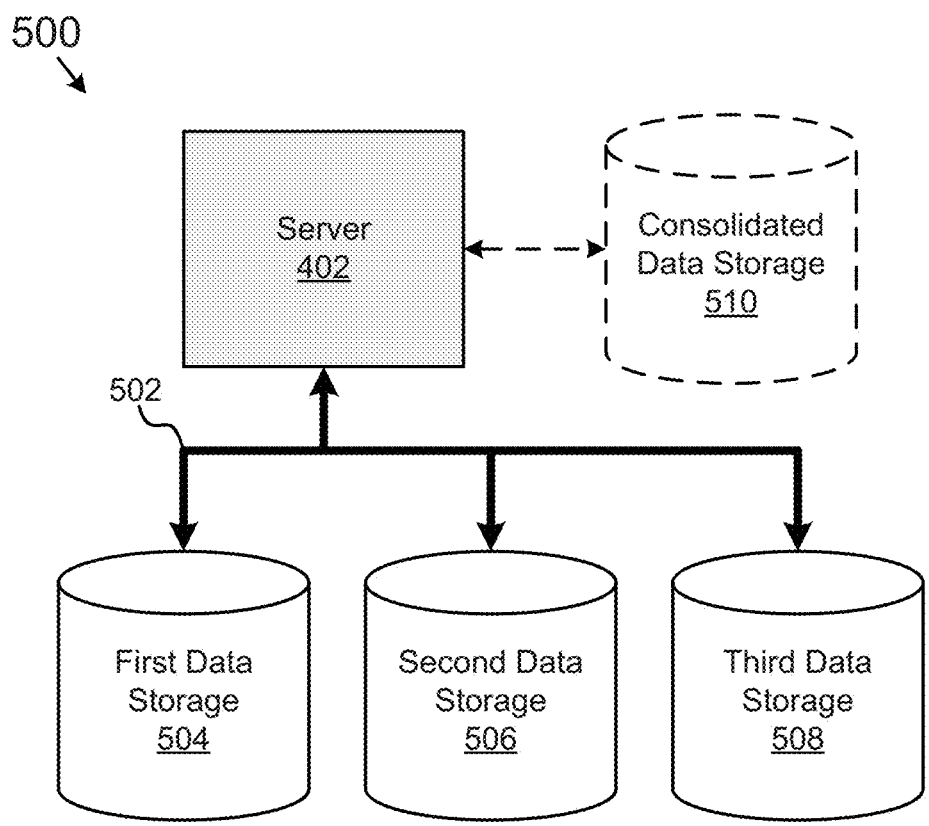
FIG. 5 illustrates a data management system 500 configured to store and manage data related to automating non-automated read-and-reply console messages according to one embodiment.

FIG. 5 illustrates a data management system 500 configured to store and manage data related to automating non-automated read-and-reply console messages according to one embodiment. In one embodiment, the system 500 may include a server 402. The server 402 may be coupled to a data-bus 502. In one embodiment, the system 500 may also include a first data storage device 504, a second data storage device 506 and/or a third data storage device 508. In further embodiments, the system 500 may include additional data storage devices (not shown). In such an embodiment, each data storage device 504-508 may host a separate database of variables, addresses, offsets, definitions, values, error codes, data dictionary files, data offset files, error code files, or the like. Alternatively, the storage devices 504-508 may be arranged in a RAID configuration for storing redundant copies of the database or databases through either synchronous or asynchronous redundancy updates.

In one embodiment, the server 402 may submit a query to selected data storage devices 504-508 to collect a consolidated set of data elements associated with read-and-reply console messages received by a message system 102. The server 402 may store the consolidated data set in a consolidated data storage device 510. In such an embodiment, the server 402 may refer back to the consolidated data storage device 510 to obtain a set of data elements actions taken on read-and-reply console messages. Alternatively, the server 402 may query each of the data storage devices 504-508 independently or in a distributed query to obtain the set of data elements associated with variables, messages, actions, statistics, and/or the like. In another alternative embodiment, multiple databases may be stored on a single consolidated data storage device 510.

In various embodiments, the server 402 may communicate with the data storage devices 504-510 over the data-bus 502. The data-bus 502 may comprise a SAN, a LAN, or the like. The communication infrastructure may include Ethernet, Fibre-Chanel Arbitrated Loop (FC-AL), Small Computer System Interface (SCSI), and/or other similar data communication schemes associated with data storage and communication. For example, the server 402 may communicate indirectly with the data storage devices 504-510, the server first communicating with a storage server or storage controller 404.

In one example of the system 500, the first data storage device 504 may store data associated with read-and-reply console messages. Read-and-reply console messages may be integrated into a console of a computing system 100 for use by a developer. In one embodiment, the second data storage device 506 may store predetermined actions taken automatically associated with the read-and-reply console messages. These actions may be compared to an operator's actions taken on a message to determine if any differences exists. The third data storage device 508 may store statistics related to duplicated non-automated read-and-reply console messages. Based on these statistics, the non-automated messages may be automated at the automation analyzer 106. A fourth data storage device (not shown) may store data associated with variables group member names.

The server 402 may host a software application configured for auditing air waybills. The software application may further include modules or functions for interfacing with the data storage devices 504-510, interfacing with a network 408, interfacing with a user, and the like. In a further embodiment, the server 402 may host an engine, application plug-in, or application programming interface (API). In another embodiment, the server 402 may host a web service or web accessible software application.

Figure 6:
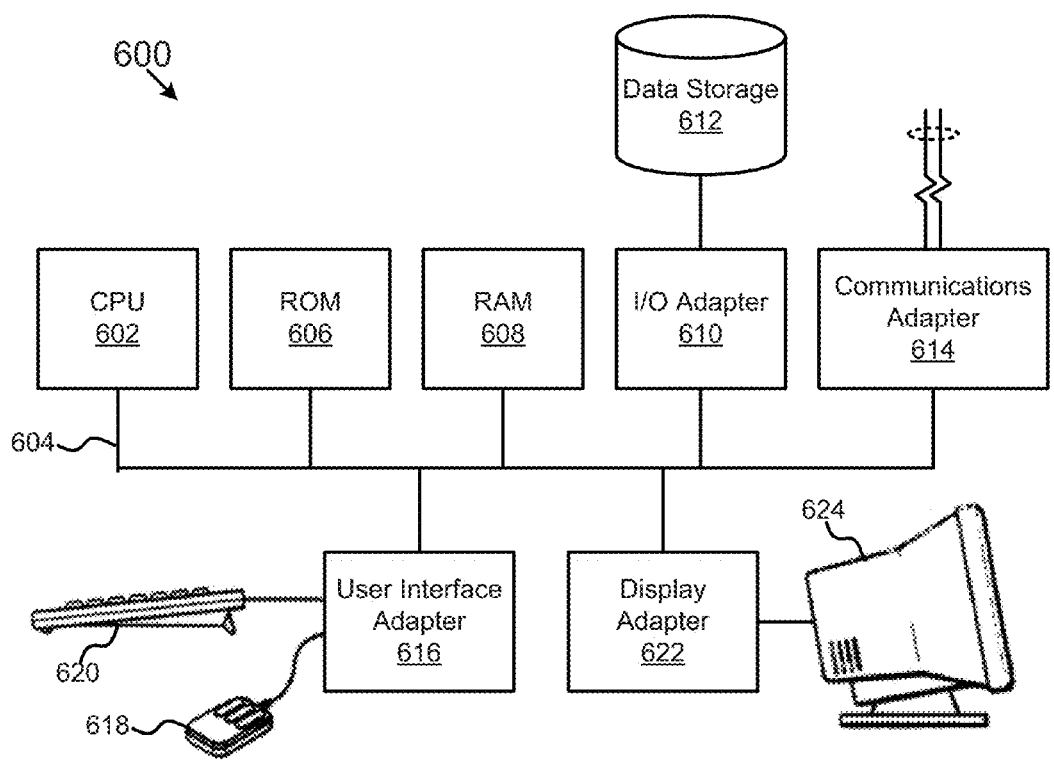
FIG. 6 illustrates a computer system adapted according to certain embodiments of the server and/or the user interface device.

FIG. 6 illustrates a computer system adapted according to certain embodiments of the server and/or the user interface device. The central processing unit ("CPU") 602 is coupled to the system bus 604. Although only a single CPU is shown, multiple CPUs may be present. The CPU 602 may be a general purpose CPU or microprocessor, graphics processing unit ("GPU"), and/or microcontroller. The present embodiments are not restricted by the architecture of the CPU 602 so long as the CPU 602, whether directly or indirectly, supports the operations as described herein. The CPU 602 may execute the various logical instructions according to the present embodiments.

The computer system 600 may also include random access memory (RAM) 608, which may be synchronous RAM (SRAM), dynamic RAM (DRAM), synchronous dynamic RAM (SDRAM), or the like. The computer system 600 may utilize RAM 608 to store the various data structures used by a software application. The computer system 600 may also include read only memory (ROM) 606 which may be PROM, EPROM, EEPROM, optical storage, or the like. The ROM may store configuration information for booting the computer system 600. The RAM 608 and the ROM 606 hold user and system data, and both the RAM 608 and the ROM 606 may be randomly accessed.

The computer system 600 may also include an input/output (I/O) adapter 610, a communications adapter 614, a user interface adapter 616, and a display adapter 622. The I/O adapter 610 and/or the user interface adapter 616 may, in certain embodiments, enable a user to interact with the computer system 600. In a further embodiment, the display adapter 622 may display a graphical user interface (GUI) associated with a software or web-based application on a display device 624, such as a monitor or touch screen.

The I/O adapter 610 may couple one or more storage devices 612, such as one or more of a hard drive, a solid state storage device, a flash drive, a compact disc (CD) drive, a floppy disk drive, and a tape drive, to the computer system 600. According to one embodiment, the data storage 612 may be a separate server coupled to the computer system 600 through a network connection to the I/O adapter 610. The communications adapter 614 may be adapted to couple the computer system 600 to the network 608, which may be one or more of a LAN, WAN, and/or the Internet. The user interface adapter 616 couples user input devices, such as a keyboard 620, a pointing device 618, and/or a touch screen (not shown) to the computer system 600. The keyboard 620 may be an on-screen keyboard displayed on a touch panel. The display adapter 622 may be driven by the CPU 602 to control the display on the display device 624. Any of the devices 602-622 may be physical and/or logical.

The applications of the present disclosure are not limited to the architecture of computer system 600. Rather the computer system 600 is provided as an example of one type of computing device that may be adapted to perform the functions of the server 1202 and/or the user interface device 1210. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASICs), very large scale integrated (VLSI) circuits, or other circuitry. In fact, persons of ordinary skill in the art may utilize any number of suitable structures capable of executing logical operations according to the described embodiments. For example, the computer system may be virtualized for access by multiple users and/or applications.

In view of exemplary systems shown and described herein, methodologies that may be implemented in accordance with the disclosed subject matter will be better appreciated with reference to various functional block diagrams. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by software, hardware, a combination thereof or any other suitable means (e.g. device, system, process, or component). Additionally, it should be further appreciated that methodologies disclosed throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 7:
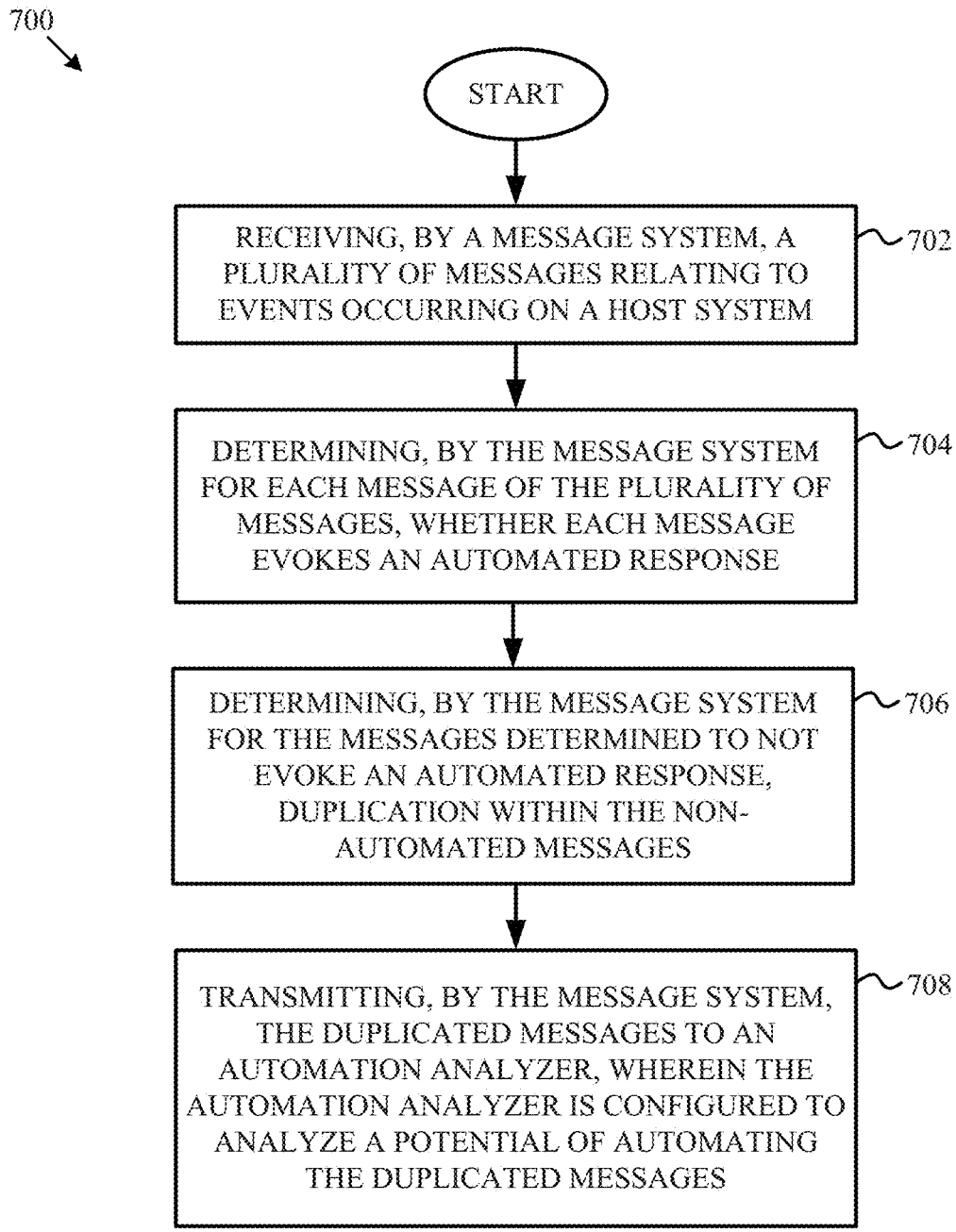
FIG. 7 is a flow chart illustrating a method for identifying automation candidates using automation degree of implementation metrics according to one embodiment of the disclosure.

FIG. 7 is a flow chart illustrating a method for identifying automation candidates using automation degree of implementation metrics according to one embodiment of the disclosure. It is noted that embodiments of method 700 may be implemented with the systems described with respect to FIGS. 1-6. Specifically, method 700 includes, at block 702, receiving, by a message system, a plurality of messages relating to events occurring on a host system. At block 704, method 700 includes determining, by the message system for each message of the plurality of messages, whether each message evokes an automated response. At block 706, method 700 includes determining, by the message system for the messages determined to not evoke an automated response, duplication within the non-automated messages. In some embodiments, determining duplication may include counting, by the message system, the number of duplicate messages that are received per day. In some embodiments, categorization rules may be generated for the duplicate messages in response to the determined duplication.

At block 708, method 700 includes transmitting, by the message system, the duplicated messages to an automation analyzer, wherein the automation analyzer is configured to analyze a potential of automating the duplicated messages. In some embodiments, the plurality of messages may be analyzed using at least one of a Correlation Analysis, a Monte-Carlo simulation, a Factor Analysis, a Mean Square Weighted Deviation (MSWD), a Regression Analysis, and a Time Series Analysis.

According to some embodiments, the messages determined to not evoke an automated response may be classified into one or more impact groups, where at least one of the one or more impact groups includes critical non-automated messages. In addition, in some embodiments, one or more of the critical non-automated messages may be classified as candidates for automation, wherein classifying a message as a candidate for automation may identify the message as a message capable of improving an automation degree of implementation metric if automated. According to some embodiments, the critical non-automated messages and the number of times each of the critical non-automated messages is received may be logged.

Figure 8:
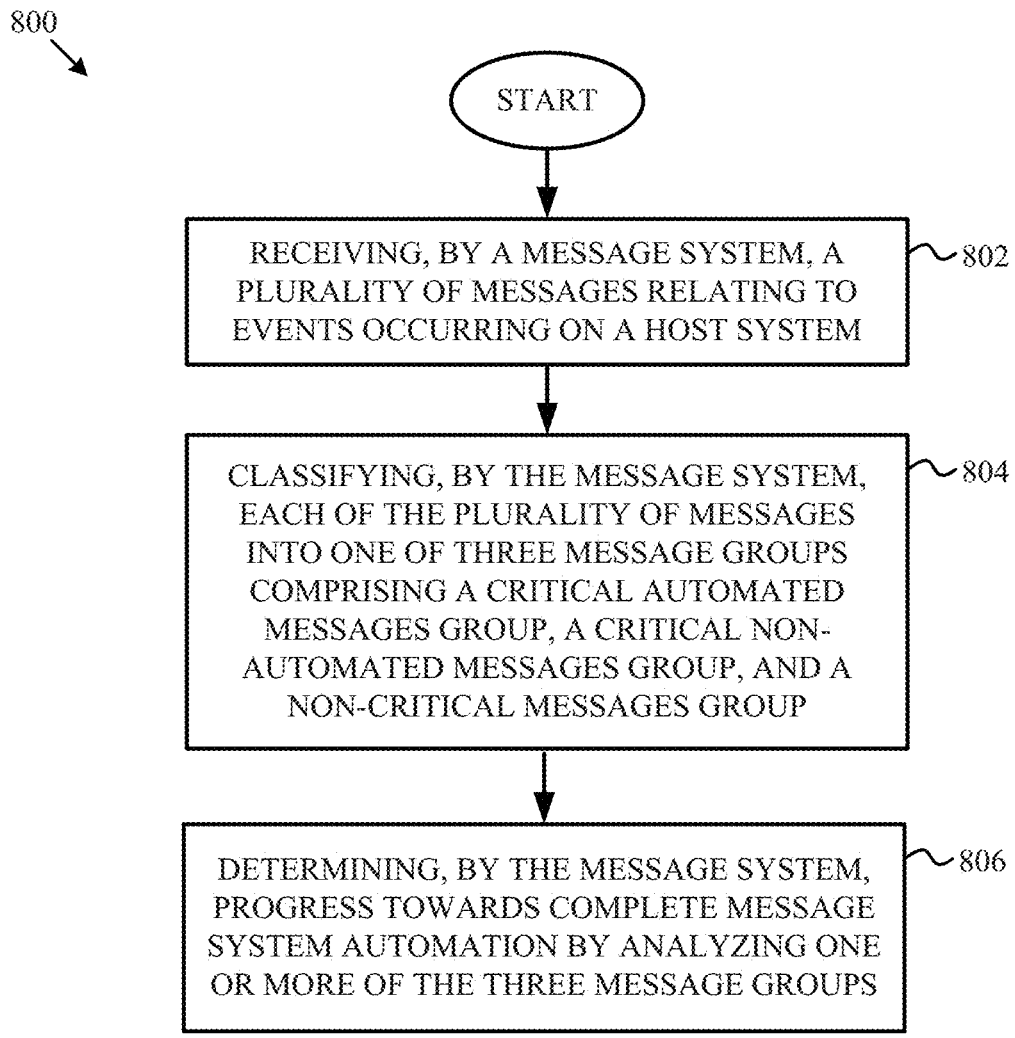
FIG. 8 is a flow chart illustrating a method for identifying progress towards complete message system integration using automation degree of implementation metrics according to one embodiment of the disclosure.

FIG. 8 is a flow chart illustrating a method for identifying progress towards complete message system integration using automation degree of implementation metrics according to one embodiment of the disclosure. It is noted that embodiments of method 800 may be implemented with the systems described with respect to FIGS. 1-6. Specifically, method 800 includes, at block 802, receiving, by a message system, a plurality of messages relating to events occurring on a host system. At block 804, method 800 includes classifying, by the message system, each of the plurality of messages into one of three message groups comprising a critical automated messages group, a critical non-automated messages group, and a non-critical messages group. In some embodiments, the number of times per day messages classified into the critical non-automated messages group are received may be counted.

At block 806, method 800 includes determining, by the message system, progress towards complete message system automation by analyzing one or more of the three message groups. In some embodiments, the plurality of messages within the three message groups may be analyzed using at least one of a Correlation Analysis, a Monte-Carlo simulation, a Factor Analysis, a Mean Square Weighted Deviation (MSWD), a Regression Analysis, and a Time Series Analysis. In some embodiments, determining progress towards complete message system automation may include determining an automation degree of implementation metric indicative of the degree of automation implemented in the message system. According to some embodiments, the automation degree of implementation metric comprises a percentage or an absolute number of messages automated in the message system.

In some embodiments, at least one of the progress towards complete message system automation and the automation degree of implementation metric may be displayed. For example, in some embodiments the displaying may occur daily, although other time intervals are equally possible within embodiments of this disclosure.

Figure 9:
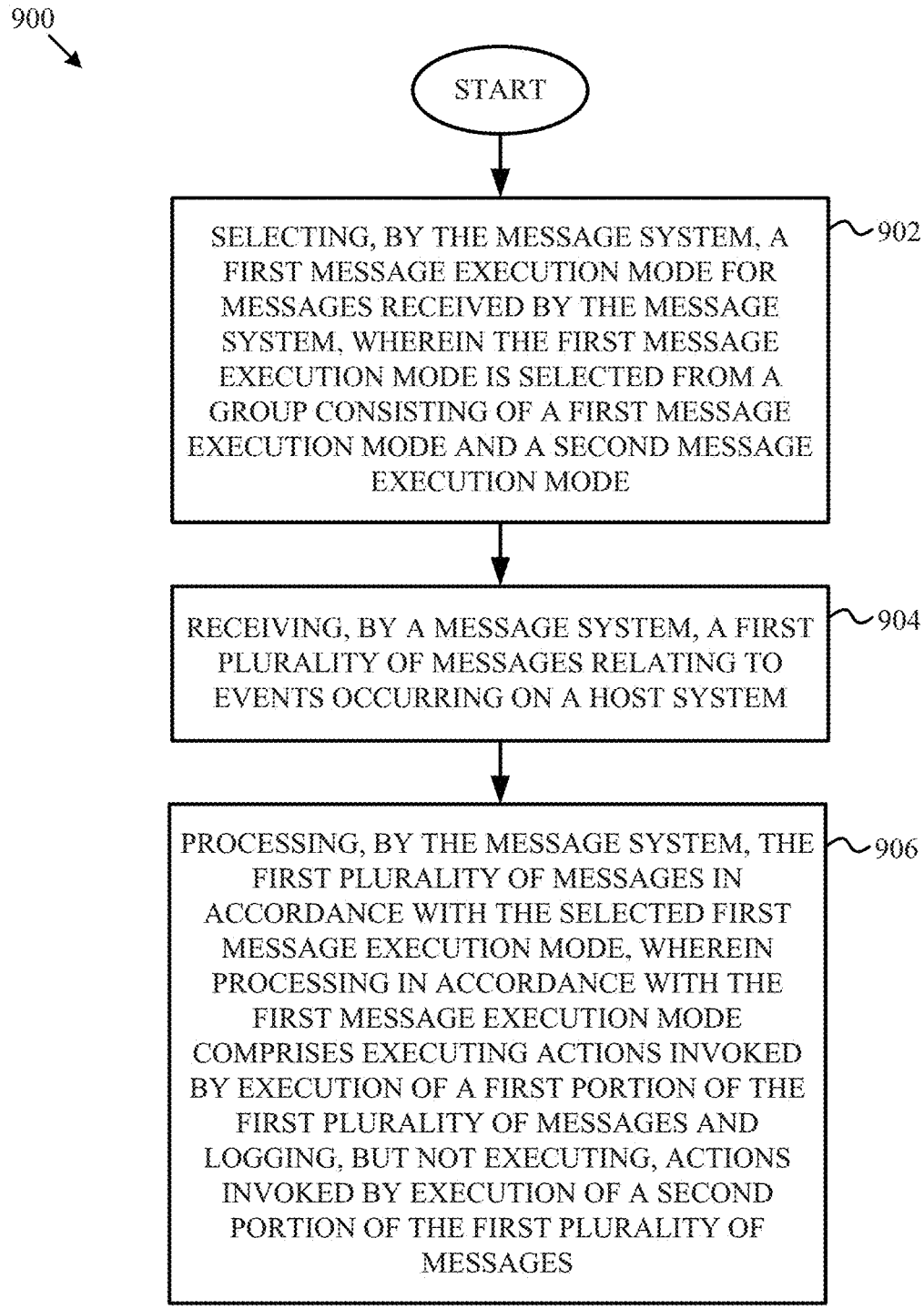
FIG. 9 is a flow chart illustrating a method for implementing debug and verify execution modes in computing systems calculating automation degree of implementation metrics according to one embodiment of the disclosure.

FIG. 9 is a flow chart illustrating a method for implementing debug and verify execution modes in computing systems calculating automation degree of implementation metrics according to one embodiment of the disclosure. It is noted that embodiments of method 900 may be implemented with the systems described with respect to FIGS. 1-6. Specifically, method 900 includes, at block 902, selecting, by the message system, a first message execution mode for messages received by the message system, wherein the first message execution mode is selected from a group consisting of a first message execution mode and a second message execution mode. At block 904, method 900 includes receiving, by a message system, a first plurality of messages relating to events occurring on a host system. At block 906, method 900 includes processing, by the message system, the first plurality of messages in accordance with the selected first message execution mode, wherein processing in accordance with the first message execution mode comprises executing actions invoked by execution of a first portion of the first plurality of messages and logging, but not executing, actions invoked by execution of a second portion of the first plurality of messages.

In some embodiments, the message system may also be configured to select the second message execution mode, receive a second plurality of messages relating to events occurring on the host system, and process the second plurality of messages in accordance with the selected second message execution mode, wherein processing in accordance with the second message execution mode comprises logging, but not executing, all actions invoked by execution of the second plurality of messages. According to some embodiments, selection of the second message execution mode may override selection of the first message execution mode. In addition, in some embodiments, selection of one of the first message execution mode and second message execution mode may be based, at least in part, on user input.

In some embodiments, the message system may also be configured to compare one or more logged actions with one or more user actions invoked in response to execution of one or more messages similar to the messages that invoked the one or more actions that were logged, but not executed. In addition, in some embodiments, the message system may be configured to determine a level of confidence in the execution of the one or more messages based, at least in part, on the comparison, wherein the level of confidence comprises a confidence percentage. According to some embodiments, the message system may also be configured to determine an automation degree of implementation metric indicative of the degree of automation implemented in the message system, wherein the automation degree of implementation metric comprises a percentage or an absolute number of messages automated in the message system.

The schematic flow chart diagrams of FIGS. 7-9 are generally set forth as a logical flow chart diagrams. As such, the depicted order and labeled steps are indicative of aspects of the disclosed methods. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media. Additionally, the firmware and/or software may be executed by processors integrated with components described above.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
receiving, by a message system, a plurality of messages relating to events occurring on a host system;
determining, by the message system for each message of the plurality of messages, whether each message evokes an automated response;
determining, by the message system for the messages determined to not evoke an automated response, duplication within the non-automated messages;
transmitting, by the message system, the duplicated messages to an automation analyzer, wherein the automation analyzer is configured to analyze a potential of automating the duplicated messages; and
classifying, by the message system, the messages determined to not evoke an automated response into one or more impact groups, where at least one of the one or more impact groups includes critical non-automated messages.

2. The method of claim 1, further comprising counting, by the message system, the number of duplicate messages that are received per day.

3. The method of claim 1, further comprising generating, by the message system, categorization rules for the duplicate messages in response to the determined duplication.

4. The method of claim 1, wherein the plurality of messages are analyzed using at least one of a Correlation Analysis, a Monte-Carlo simulation, a Factor Analysis, a Mean Square Weighted Deviation (MSWD), a Regression Analysis, and a Time Series Analysis.

5. The method of claim 1, further comprising:
logging the critical non-automated messages and logging the number of times each of the critical non-automated messages is received; and
classifying one or more of the critical non-automated messages as candidates for automation, wherein classifying a message as a candidate for automation identifies the message as a message capable of improving an automation degree of implementation metric if automated.

6. An apparatus, comprising:
a processor; and
a memory coupled to the processor, where the processor is configured to perform the steps of:
receiving a plurality of messages relating to events occurring on a host system;
determining, for each message of the plurality of messages, whether each message evokes an automated response;
determining, for the messages determined to not evoke an automated response, duplication within the non-automated messages;
transmitting the duplicated messages to an automation analyzer, wherein the automation analyzer is configured to analyze a potential of automating the duplicated messages; and
wherein the processor is further configured to perform a step of classifying the messages determined to not evoke an automated response into one or more impact groups, where at least one of the one or more impact groups includes critical non-automated messages.

7. The apparatus of claim 6, wherein the processor is further configured to perform a step of counting the number of duplicate messages that are received per day.

8. The apparatus of claim 6, wherein the processor is further configured to perform a step of generating categorization rules for the duplicate messages in response to the determined duplication.

9. The apparatus of claim 6, wherein the plurality of messages are analyzed using at least one of a Correlation Analysis, a Monte-Carlo simulation, a Factor Analysis, a Mean Square Weighted Deviation (MSWD), a Regression Analysis, and a Time Series Analysis.

10. The apparatus of claim 6, wherein the processor is further configured to perform steps of:
logging the critical non-automated messages and logging the number of times each of the critical non-automated messages is received; and
classifying one or more of the critical non-automated messages as candidates for automation, wherein classifying a message as a candidate for automation identifies the message as a message capable of improving an automation degree of implementation metric if automated.

11. A computer program product, comprising:
a non-transitory computer readable medium comprising instructions which, when executed by a processor of a computing system, cause the processor to:
receive a plurality of messages relating to events occurring on a host system;
determine, for each message of the plurality of messages, whether each message evokes an automated response;
determine, for the messages determined to not evoke an automated response, duplication within the non-automated messages;
transmit the duplicated messages to an automation analyzer, wherein the automation analyzer is configured to analyze a potential of automating the duplicated messages; and
to classify the messages determined to not evoke an automated response into one or more impact groups, where at least one of the one or more impact groups includes critical non-automated messages.

12. The computer program product of claim 11, wherein the non-transitory computer readable medium further comprises instructions which, when executed by the processor of the computing system, cause the processor to count the number of duplicate messages that are received per day.

13. The computer program product of claim 11, wherein the non-transitory computer readable medium further comprises instructions which, when executed by the processor of the computing system, cause the processor to generate categorization rules for the duplicate messages in response to the determined duplication.

14. The computer program product of claim 11, wherein the plurality of messages are analyzed using at least one of a Correlation Analysis, a Monte-Carlo simulation, a Factor Analysis, a Mean Square Weighted Deviation (MSWD), a Regression Analysis, and a Time Series Analysis.

15. The computer program product of claim 14, wherein the non-transitory computer readable medium further comprises instructions which, when executed by the processor of the computing system, cause the processor to:

log the critical non-automated messages and log the number of times each of the critical non-automated messages is received; and classify one or more of the critical non-automated messages as candidates for automation, wherein classifying a message as a candidate for automation identifies the message as a message capable of improving an automation degree of implementation metric if automated.

\* \* \* \* \*